Jan. 16, 1940.   I. J. KNUDSON   2,187,038
METHOD OF AND APPARATUS FOR COLD CONTROL
Filed May 14, 1935   2 Sheets-Sheet 1

INVENTOR
Irving J. Knudson
BY
his ATTORNEY

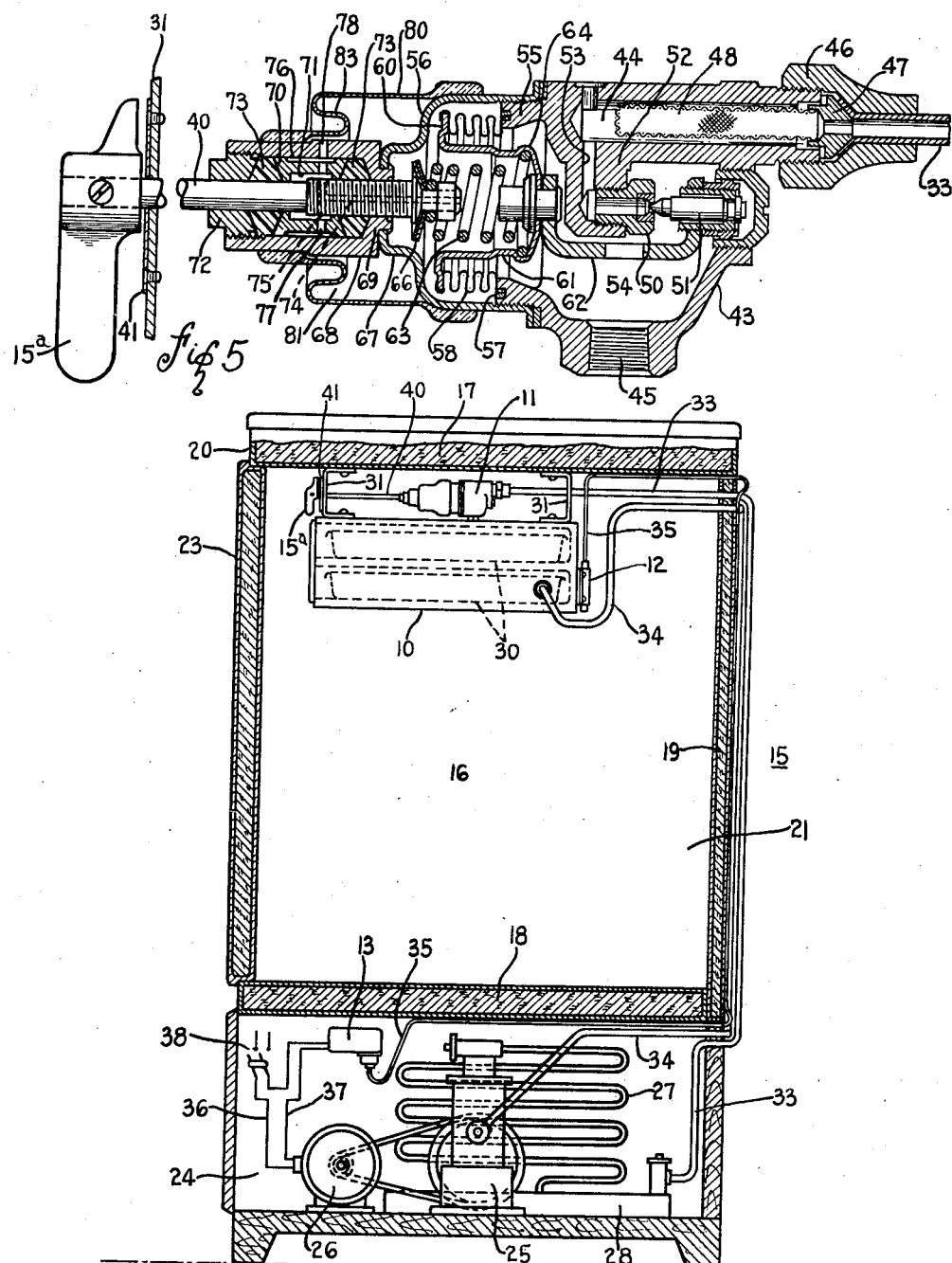

Patented Jan. 16, 1940

2,187,038

UNITED STATES PATENT OFFICE 2,187,038

METHOD OF AND APPARATUS FOR COLD CONTROL

Irving J. Knudson, Kenilworth, Ill., assignor to Detroit Lubricator Company, Detroit, Mich., a corporation of Michigan Application May 14, 1935, Serial No. 21,354

4 Claims. (Cl. 62—178)

My invention relates to the method of and apparatus for refrigerating and more particularly to the method of and apparatus for controlling the rate of heat transfer to a refrigerant evaporator of a refrigerating system.

In refrigerating apparatus having provision for controlling the rate of heat transfer to the evaporator, commonly known as cold control, so as to provide for obtaining evaporator temperatures below normal operating temperature for fast freezing purposes, it has usually been the practice in the past to utilize an adjustable thermostat for cutting-in and cutting-out the compressor between given temperature limits of the evaporator to maintain a normal average evaporator temperature and adjustment of which, toward colder positions, allows for different average evaporator temperatures below the normal operating evaporator temperature. The chief objection to the method of obtaining cold control by the use of the adjustable thermostat is that it necessitates sacrificing efficiency in operation of the compressor and therefore of the entire refrigerating system. That is to say, in order to have cold control through adjustment of a thermostat operating with the usual expansion valve which is operable to maintain a constant evaporating temperature, as is well known in the art, it is necessary that the compressor be operated at less than maximum efficient operation, or at a lower suction pressure during maintenance of normal evaporator temperature than would otherwise be necessary. This is necessary in order that the thermostat when set for fast freezing, or for a lower evaporator temperature than normal, will be affected by the evaporating refrigerant which must be at an equal or lower temperature than that called for to operate the thermostat when set at the colder or lower evaporator position. There must be a lower temperature to cut-out the compressor at the lowest temperature setting of the thermostat which may be desired. Consequently, the compressor and therefore the entire system is operating inefficiently, or at too low an evaporating temperature and pressure, during normal operation. By compressor efficiency I mean the ratio of the total number of heat units extracted from the evaporator by the refrigerant to the number of heat units of work necessary to be added to the refrigerant by the compressor in order for the refrigerant vapor to be compressed to proper condensing conditions, and sometimes called the coefficient of performance. By fast freezing I mean the lowering of the setting of the adjustable evaporator controlling means so that a lower average evaporator temperature is required to satisfy the adjustable controlling means so that the condensing unit is made to operate for longer periods of time thereby causing the water to freeze in a shorter length of time.

Accordingly, the principal object of my invention is to provide a new and improved method of and apparatus for refrigerating having provision for cold control without sacrificing operating efficiency of the system during normal operation.

Another object of my invention is to provide a new and improved method of and apparatus for controlling the rate of heat transfer to a refrigerant evaporator in a manner such that the refrigerating system can be operated at its highest efficiency during maintenance of normal operating evaporator temperature.

More specifically, it is an object of my invention to provide a new and improved method of and apparatus for controlling the rate of heat transfer to a refrigerant evaporator in a refrigerating system in such a manner that for normal operating temperature, at which the system operates during the greater part of the time, the compressor can be operated at maximum efficiency.

Another object of my invention is to provide a new and improved method of and apparatus for controlling the rate of heat transfer to an evaporator and in such a manner as to provide for the ready accessibility of the manually operated temperature regulating means through the door opening of a refrigerator cabinet.

These and other objects of my invention will be apparent from a reading of the following description taken in connection with the accompanying drawings which form a part of this specification, and in which drawings—

Fig. 4 is a side view shown partly in elevation and partly in cross-section of a refrigerating system of the household type embodying my invention, and Fig. 5 is a view shown in longitudinal cross-section of an expansion valve control device employed in the refrigerating system and embodying other features of my invention.

Figure 1:
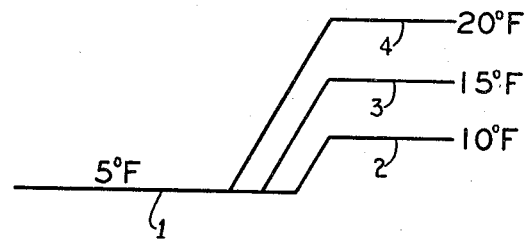
Fig. 1 is a temperature chart shown to illustrate a well known method of obtaining cold control in a refrigerating system by adjusting a thermostat.

Referring first to Fig. 1 of the drawings, this chart illustrates a well known method of obtaining cold control in a refrigerating system and in connection with which a brief description will aid, it is thought, in understanding my invention. The method illustrated in Fig. 1 consists of establishing the lowest evaporator temperature which might be desired to be obtained and then controlling the evaporating pressure of the refrigerant in the evaporator in accordance with the lowest desired temperature. The temperature control is then regulated to cut-in and cut-out the compressor at a normal or at any other temperatures above the low established temperature. This method is usually carried out by the use of an automatic expansion valve and an adjustable thermostat. In accordance with this method the expansion valve has a fixed setting, as determined by the lowest desired evaporator temperature while the thermostat is adjustable. The relative settings of an adjustable thermostat and an automatic expansion valve are shown in the chart of Fig. 1 wherein the relative height of the line 1, with respect to the other lines, represents the fixed temperature setting of the expansion valve while the length represents the amount of evaporator subject to cooling by the evaporating refrigerant. The lines 2, 3 and 4 represent different settings of the adjustable thermostat, with the joining lines showing the rise in temperature of the refrigerant vapors before leaving the evaporator.

For the purpose of describing the method illustrated in Fig. 1, the normal operating average evaporator temperature is taken as 20° F. and the lowest desired or fastest freezing average evaporator temperature is taken as 10° F. Although, theoretically, the expansion valve could be set to maintain an average evaporator temperature equal to the fastest freezing temperature that will be desired, or 10° F., the expansion valve is usually set to maintain the evaporator at a slightly lower temperature than the fast freezing temperature desired in order to compensate for the heat given up by the temperature responsive bulb of the thermostatic switch, and to insure positive operation of the temperature control as is well known. For convenience of exposition the evaporator temperature selected for maintenance by the expansion valve is taken at 5° F. and this fixed setting of the expansion valve is represented in the chart of Fig. 1 by the horizontal line 1. It will be apparent that the evaporator temperature for which the expansion valve is set to maintain is governed by the lowest freezing temperature desired or selected, that is, the temperature setting of the expansion valve must be as low or lower than the established fastest freezing temperature. For example, if the expansion valve is set to maintain an evaporator temperature of say 15° F. it will be seen that even though the thermostatic switch is set for 10° F. this temperature would never be reached since the expansion valve would maintain the relative high evaporating refrigerant temperature of 15° F. with the result that the thermostat would never be affected to cut-out the compressor.

Since in this method the expansion valve must be set to maintain an evaporator temperature as low, or lower than the lowest evaporator temperature desired and since the setting of the expansion valve remains fixed, the expansion valve is operating to admit refrigerant to the evaporator to maintain an evaporating temperature of 5° F. regardless of the setting of the thermostat. For example, when the thermostat is set to cut-in and cut-out the compressor at a normal evaporator operating temperature or 20° F. the expansion valve having a fixed setting is operating to maintain an evaporating temperature of 5° F. As a result, the compressor is operating at less than maximum efficiency for all temperatures above 5° F. and at low efficiency during the warmest evaporator temperature or normal operation, or at 20° F. This is inefficient operation and particularly so since the system operates during the greater part of the time at normal operating temperature.

Figure 2:
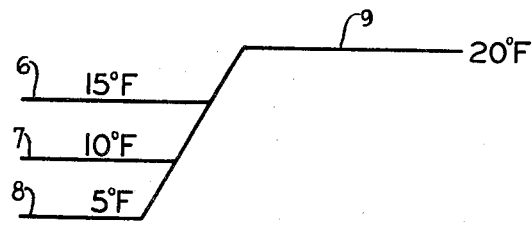
Fig. 2 is a temperature chart shown to illustrate my new and improved method of obtaining cold control.
Figure 3:
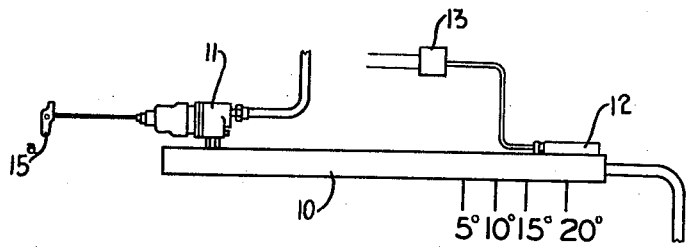
Fig. 3 is a diagrammatic view of part of a refrigerating system and embodying my invention.

Referring now to the chart of Fig. 2, which illustrates my method of providing for cold control in a refrigerating system, this method consists of maintaining the refrigerant in the evaporator at normal operating pressure during operation of the compressor and decreasing the maintained pressure to obtain corresponding evaporator temperatures below normal operating temperature for fast freezing purposes. This method may be carried out by the use of an adjustable expansion valve which may be adjusted to change the suction pressure, and a thermostat which has a fixed setting. In the chart of Fig. 2, the lines 6, 7 and 8 represent different settings of the adjustable expansion valve while the line 9 represents the fixed setting of the thermostat switch relative to the expansion valve. In this method, the range of adjustment of the expansion valve depends on the highest evaporator temperature desired. For example, if 20° F. is selected as the highest temperature desired, or normal cooling temperature, then theoretically the expansion valve can be set to maintain a pressure in the evaporator corresponding to a temperature of 20° F. although, as represented in the diagram, the highest setting of the expansion valve is for a 15° F. evaporating temperature. The expansion valve may be adjusted to maintain different evaporator pressures below normal operating pressure and will maintain any pressure below normal operating pressure even though the thermostat setting is fixed at 20° F. as will be understood by reference to Fig. 3. Fig. 3 shows an evaporator 10, and expansion valve 11, a temperature responsive bulb 12, and a switch 13, the switch 13 being operable in response to the temperature responsive bulb to cut-in and cut-out a compressor (not shown) in the well known manner. The switch 13 is set to cut-in and cut-out the compressor between temperature limits and is set at an average temperature between cut-in and cut-out of 20° F. to conform with the temperature values employed in connection with the charts. The temperature responsive bulb 12 is arranged in good heat transfer relation with the evaporator and preferably adjacent the outlet end, as shown. For normal operation, the expansion valve 11 is set to maintain the pressure of the refrigerant in the evaporator 10 at 15° F. by means of an adjusting handle 15ª, the details of such adjustment being hereafter described. If now the system is started from a warm condition, the expansion valve operates to admit refrigerant to the evaporator delivered thereto by the compressor, to maintain an evaporator pressure corresponding to a temperature of 15° F. The temperature in the evaporator is first reduced at the inlet or expansion valve end to 15° F. and gradually the temperature is reduced along the length of the evaporator approaching the location of the bulb 12. As the temperature of the evaporator is reduced to 15° F. at a point adjacent to and in advance of the location of the bulb 12, the temperature of the evaporator at the bulb will be 20° F. by reason of the heat conductivity of the metallic evaporator or coil. The thermostatic switch 13 will act to cut-out the compressor upon a decrease in temperature below 20° F. at the bulb and to cut-in the compressor upon an increase in temperature above 20° F. at the bulb, and thus all but a small portion of the evaporator adjacent the bulb 12 is maintained at a substantially constant temperature of 15° F. As previously stated, the normal operating temperature was selected at 15° F. for illustrative purposes only, for it will be seen that this temperature, theoretically, could be 20° F. to correspond with the setting of the thermostat. However, because of the heat given up by the bulb 12, and to insure positive operation of the temperature control, for practical purposes the expansion valve would be set to maintain a temperature slightly lower than the temperature setting of the thermostat. Since the expansion valve is set to maintain an evaporator temperature substantially equal to the temperature setting of the thermostat 13, the compressor will be operating at the highest possible intake or suction pressure and at maximum efficiency during the maintenance of normal evaporator temperature, or during the greater part of the time. It will be seen that the evaporator will not be completely refrigerated to the bulb at a temperature of 15° F., but the distance over which the increase in temperature or super-heat of the refrigerant vapors from 15° F. to 20° F. occurs will be relatively small and negligible. If it is desired to obtain a faster freezing or lower average evaporator temperature than normal operating temperature, say a temperature of 10° F., then the expansion valve is adjusted to change the suction pressure and is set to maintain an evaporator pressure corresponding to a temperature of 10° F., while the thermostatic switch remains as before, to cut-in and cut-out the compressor at temperatures above and below a temperature of 20° F. at the bulb 12. The liquid refrigerant will be controlled in the same manner as described above, but the distance to the thermostat is greater than at normal conditions and the thermostatic bulb 12 is affected by reason of the conductivity of the metallic evaporator before the temperature of the evaporator at the bulb is reduced to 10° F. This may reduce the working or effective portion of the evaporator but as the evaporator is operated usually at normal conditions, this inefficiency is relatively unimportant and exists only for short occasional periods.

Referring now to Fig. 4 there is shown a refrigerating apparatus of the household type including a cabinet 15 having a food storage compartment 16, the cabinet being constructed in the usual manner of heat insulating walls including a top wall 17, bottom wall 18, rear wall 19, front wall 20 and side walls 21. In the front wall 20 is provided the usual opening through which access may be had to the food storage compartment, the opening being closable by a closure member or door 23. In the present instance, the cabinet 15 is provided with a machinery compartment 24, beneath the food storage compartment 16, for housing the condensing element although, if desired, the condensing element may be located at a remote point such as in the basement of the building. The condensing element includes a refrigerant compressor 25, an electric motor 26 for driving the compressor, a condenser 27 and a refrigerant receiver 28.

Disposed within the food storage compartment 16, and suspended from the underside of the top wall 17 of the cabinet, is the cooling element or refrigerant evaporator 10. It is to be understood that any suitable type of refrigerant evaporator may be employed and that the evaporator may be disposed in the food compartment 16, as shown, or it may be disposed in a second or freezing compartment (not shown) with which some types of cabinets are provided. The evaporator 10 is provided with the usual pans or trays 30 for containing articles to be frozen such as water, desserts, etc. The evaporator 10 is suspended, in the present instance, by means of a pair of U-shaped brackets 31, one at each end of the evaporator.

Within the food storage compartment 16, and preferably mounted on the evaporator 10, is the adjustable automatic expansion valve 11 for controlling the admittance of refrigerant to the evaporator to maintain a desired pressure therein and corresponding temperature. Refrigerant is supplied by the compressor 25 through the receiver 28 and supply conduit 33 to the automatic expansion valve and returns through return or suction conduit 34 to the compressor 25. Arranged in good heat transfer relation with the evaporator 10, and preferably adjacent the outlet of the evaporator, is the temperature responsive element or bulb 12. Disposed within the machinery compartment 24 is the automatic switch 13 operatively connected to the thermostat bulb 12 through conduit 35 and which is in series circuit with motor 26 by means of the lead wires 36 and 37. The switch 13 may be of the pressure operated type operable in response to changes in pressure of a fluid contained in the thermostat bulb 12, or it may be of the thermostatic type. A manually operated switch 38 is provided in series circuit with the pressure switch 13 and the motor 26.

The expansion valve control device may be of any suitable type having provision for adjusting the same to control the pressure of the refrigerant within the evaporator and therefore the evaporator temperature by controlling the admission of refrigerant to the evaporator. In the present control device, which is shown in detail in Fig. 5, the adjusting mechanism includes an externally projecting rod 40 which extends toward the door 23 of the cabinet and on the end of which is fixed the handle 15ª for manually adjusting the control device, which handle is readily accessible through the food compartment door opening. A dial may be provided on a plate 41 having an aperture for receiving the rod 40 and the plate may be fixed to the forward U-shaped bracket 31 or otherwise suitably mounted. On the face of the dial, characters may be provided to indicate the range of temperature attainable between normal operating temperature and fast freezing temperature.

The expansion valve 11 includes a valve casing 43 having an inlet chamber 44 and an outlet 45. To the inlet 44 is connected the refrigerant supply line 33, the end thereof being flared and clamped between a nut 46 and a nipple 47 to the casing, the nipple also being held in position against the casing by the nut. The nipple supports a strainer 48 within the inlet chamber 44. The outlet 45 may be connected to the inlet side of the evaporator 10 in any suitable manner, such as by a fitting or nipple (not shown). Within the valve casing 43 is a valve port member 50, supported in the end portion of a projecting portion 52 of the side wall of the casing 43 and which has a valve seat in one end for cooperating with the conical face of a needle valve 51 for controlling flow of refrigerant from the inlet to the outlet. When the valve 51 is in open position, refrigerant flows from the high side inlet chamber 44 through connecting passageway 53 to the valve port and therethrough into the low side chamber 54 of the device from whence it is drawn by the compressor 25 into the evaporator 10.

The valve casing 43 is formed with a tubular extending portion 55 which is externally threaded to receive an internally threaded housing or cap 56. Within the cap 56 and mounted on the transverse circular end wall 57 of the casing 43 is a pressure responsive element 58 which may be a substantially cylindrical, circumferentially corrugated, resilient, metallic bellows. One end of the bellows is hermetically secured and sealed to the transverse wall 57 of the casing 43 while the other or free end is secured and sealed to a movable wall means 60. The bellows 58 and the wall means 60 closing the free end thereof, cooperate to close and seal the low side chamber 54 from the interior of the housing 56. The wall means 60 is formed with a cup-shaped portion 61 which extends centrally through the bellows 58 and into the valve casing 43, at which point it is connected to the valve 51 by means of a yoke 62. Fluctuation of pressure of the refrigerant in the evaporator 10 and therefore in the low side chamber 54 of the valve casing affects the bellows 58 which accordingly expands and collapses and by such movement throttles the valve 51 and thus maintains a substantially constant evaporator pressure and corresponding temperature.

A helical coil spring 63 is disposed in the cup-shaped portion of the wall means 60, and exerts a force, when under compression, opposing the expansion of bellows 58, and the magnitude of the spring force determines the suction pressure and therefore the refrigerant pressure that will be maintained in the evaporator, the force exerted by the spring being variable through adjustment of the handle 15ᵃ to obtain different refrigerant pressures and corresponding temperatures in the evaporator. In the present instance, the spring 63 is adapted to be placed either under compression, and thus, oppose expansion of the bellows 58, or be placed under tension and thus aid expansion of the bellows, which setting depends upon the kind of refrigerant medium employed in the refrigerating system. For example, if a refrigerant such as sulphur dioxide is employed which attains the desired refrigerant temperature at a pressure below atmospheric pressure then the spring 63 would be placed under tension while if a refrigerant such as methyl chloride is employed which attains the desired temperature at pressure above atmospheric pressure then the spring would be placed under compression.

In order that the spring 63 may be placed either under compression or tension, the cup-shaped portion of the wall means 60 is formed on its inner side wall with an annular groove or outwardly bent portion 64 into which the adjacent end coil of the spring 63 is sprung and tightly held so that it will not dislodge when the spring is placed under tension. The groove 64 is preferably formed adjacent the end wall of the cup-shaped portion so that when the spring 63 is placed under compression the end of the spring will bear against the inner transverse wall of the cup-shaped portion. The other end of the spring surrounds an end portion of the rod 40 which extends into the housing 56 and which has a reduced portion or recess adjacent its end for receiving the adjacent end coil of the spring 63. The end coil of the spring is wound tightly around the reduced portion of the rod so that when the spring is placed under tension the coil will abut the adjacent shoulder formed by the reduced portion. A bearing member 66 is provided and against which the spring 63 bears when under compression and the bearing member 66 has an aperture for receiving the reduced portion of the rod 40, and may be of the type adapted to be sprung into place on the rod. The bearing member 66 is disposed between the end coil of the spring and the adjacent shoulder formed by the reduced portion, which shoulder prevents movement of the bearing member 66 longitudinally of the rod 40.

The housing or cap 56 is formed with a cup-shaped outwardly extending portion 67 provided with an aperture in its end transverse wall for receiving a reduced portion of a tubular extension member 68 which is peened over to rigidly secure and seal the tubular-shaped member to the housing. The tubular extension 68 has a reduced tubular portion 69 adjacent the housing 56 and which has an aperture screw-threaded to receive the threaded adjusting rod 40. Within the bore of the extension 68 is disposed a cylindrical member 70 having a central aperture or bore for receiving the adjusting rod 40 and an annular recess intermediate its ends providing an annular chamber 71 surrounding the rod 40. The outer end of the extension member 68 is threaded to receive a packing nut 72 and packing material 73 is provided within the bore of the extension between the inner end of the packing nut 72 and the adjacent end of the cylindrical member 70 and between the other end of the cylindrical member 70 and the adjacent end wall of the extension member formed by the reduced tubular portion 69. The rod 40 is provided with a central bore 74 running out at its inner end and which is in communication with the annular chamber 71 through a transverse connecting bore 75. The outer cylindrical wall of the member 70 is also provided with an annular recess 76 which is in communication with the annular chamber 71 through radially disposed bores 77. The tubular extension 68 is provided with a bore 78 through its side wall connecting with annular chamber 76.

Enclosing the outwardly projecting end portion of the housing 56 there is a housing or sleeve member 80 which is preferably constructed of a pliable or flexible material such as rubber. One end of the sleeve member 80 surrounds and embraces a portion of the outer wall of the housing 56 and the other end has a reduced portion in the form of a neck which surrounds and embraces the outer wall of the extension 68. The sleeve member 80 encloses the portion of the extension, wherein the aperture 78 is located and provides a breather chamber 81 in communication with the interior of the housing 56. The rubber sleeve 80 is made so that it has to be stretched or expanded at its ends from its inert position in order to encompass the housing member 56 and the extension 68 so that by its inherent resilience it provides an air-tight seal for the chamber 81. A portion of the wall has a sinuous form or convolutions, such as, one or more S-shaped folds as at 83. Preferably the folds or convolutions 83 are provided in the portion between the neck and body of the rubber sleeve as shown. When air is forced into the breather chamber 81 by the action of the bellows 58 the folded portion of the rubber sleeve will unfold by the increased pressure in the breather chamber and thus the capacity of the breather chamber will be increased. When the air flows back into the housing 56 the expanded wall of the sleeve will return to normal position by its inherent resilience. Thus there will be a breathing action between the chambers without permitting indrawing of moisture laden atmosphere to the interior of housing 56, and without opposing free operation of the bellows 58.

A complete operation of the refrigerating system in connection with my method of obtaining cold control will now be described with the system utilizing a refrigerant medium of the kind that reaches the desired temperatures at pressures above atmospheric pressure. The thermostatic switch 13 is set or adjusted so that it will cut-in and cut-out the compressor in accordance with the highest temperature desired or normal operating temperature which may be taken as before at 20° F. The expansion valve 11 is adjusted so that it controls the admission of refrigerant to the evaporator 10 to maintain a refrigerant pressure therein corresponding substantially to but preferably slightly below the temperature for which the thermostatic switch 13 is set to operate, and which may be taken as 15° F. To set the expansion valve so that it will control the admittance of refrigerant to the evaporator 10 to maintain the temperature thereof at 15° F. The spring 63 is placed under a corresponding compression force through rotation of rod 40 by means of the handle 15ª, which handle is readily accessible through the food compartment door opening. The spring 63, under compression, exerts a force opposing expansion of the bellows 58 and therefore acts to unseat the valve 51. The force under which the spring is compressed is made such that the pressure necessary in chamber 54 acting on the bellows to seat the valve will correspond to a temperature of 15° F. The spring 63 will hold the valve in open position until the pressure in chamber 54 builds up and exerts a force on the bellows equal to the force exerted by the spring at which time the valve will be closed. Due to fluctuation in the pressure of the refrigerant in chamber 54 the valve is throttled due to the balancing and unbalancing of the opposing forces so that a substantially constant pressure, and therefore temperature, is maintained in the evaporator 10. The greater the force exerted by the spring, the greater the pressure will be maintained in chamber 54 and the higher the temperature. When the suction pressure, and therefore the pressure in the evaporator, is reduced by the compressor 25 such that the force exerted by the refrigerant against the bellows 58 become less than the force exerted by the spring 63, the valve will be opened to admit refrigerant to the evaporator. To obtain a lower suction pressure, and therefore a lower evaporator temperature, the force exerted by spring 63 is reduced by means of the manual adjustment member 15. When the force exerted by spring 63 is reduced, the compressor 25 will have to lower the suction pressure correspondingly, or to the pressure at which the reduced spring force will overcome the force exerted by the refrigerant acting against the bellows 58 before the valve will be opened. It will therefore be seen that by changing the force exerted by spring 63 the suction pressure, and therefore the evaporator temperature, may be regulated. When the suction pressure is lowered, the compressor will of course be pumping more rarefied refrigerant at a lower pressure and, if the discharge pressure remains constant, between greater pressure limits. Therefore, the compressor will not be operating at as great a capacity. It is to be understood however that by operating at maximum efficiency or capacity, I refer only to the time the compressor is actually operating. Or in other words, the compressor will not be doing all the work at this lower pressure which it is capable of doing when it operates at the higher pressure. However, my method provides for utilizing the full capacity of the compressor during normal operation of the system, that is, when fast freezing is not desired, and since refrigerating apparatuses operate for the greater part of the time to maintain relatively high temperatures as compared to fast freezing temperatures, it will be appreciated that my apparatus operates more efficiently and that a relatively smaller compressor may be employed than could be successfully employed in conventional apparatuses of the type described in connection with Fig. 1. When the suction pressure is decreased, the pressure and corresponding temperature of the refrigerant admitted by the expansion valve to the evaporator is decreased, resulting in a corresponding lowering of the evaporator temperature. As previously mentioned, when the expansion valve is adjusted to obtain fast freezing, refrigerant is supplied to the evaporator at a lower pressure, and as the bulb setting remains constant, less of the evaporator is refrigerated for the colder refrigerant will conduct the heat away from the bulb 12 before the evaporating liquid refrigerant reaches that part of the evaporator coil to which the bulb is attached, and the compressor will be stopped. However, by my method and apparatus the evaporator may be completely refrigerated and the compressor will have its full capacity utilized when fast freezing is not desired, or during the greater part of the time, resulting in a refrigerating apparatus which is economical to operate.

When the system is started from a warm condition, the compressor withdraws the expanded refrigerant vapor from the evaporator 10 and from chamber 54 of the expansion valve, through suction conduit 34 and delivers compressed liquid refrigerant to the high side chamber 44 of the expansion valve. The valve 51 is held in closed position on the off phase of the system due to the increased back pressure of the expanded refrigerant in chamber 54 exerting a greater force acting on the bellows 58 tending to close the valve against the opposing or opening force of the spring 63. When the compressor 25 has withdrawn gaseous refrigerant from chamber 54 such that its force, acting on the bellows 58, becomes less than the opposing force of the spring, the spring will then act to unseat the valve and refrigerant will be admitted to the low side chamber 54. The valve will now remain open until the pressure for which the spring 63 is set to maintain in the evaporator is reached after which it will throttle in accordance with fluctuation in pressure in the evaporator to maintain the pressure substantially constant. After the valve is opened and refrigerant is admitted to the evaporator, the temperature of the evaporator begins to decrease first in the inlet side to the temperature of 15° F. and as the compressor continues to deliver refrigerant thereto the temperature gradually decreases to 15° F. along the length of the evaporator. As previously described in connection with the chart of Fig. 2, the thermostatic switch 13 operates to cut-out the compressor when the temperature of the evaporator at the bulb 12 is 20° F., and to cut-in the compressor when the 20° F. temperature is exceeded. If now it is desired to obtain a faster freezing evaporator temperature of say 10° F., then the rod 40 is rotated by means of the handle 15ᵃ to decrease the force exerted by the spring and therefore to decrease the force necessary to be exerted by the pressure of the refrigerant in chamber 54 to balance the force of the spring. The expansion valve now operates to admit refrigerant to the evaporator to maintain a pressure therein corresponding to a temperature of 10° F. When the 10° F. refrigerant is being supplied to the evaporator, a point adjacent bulb 12 is 10° F. but the point will be, however, more remote than when 15° F. refrigerant is being supplied by the valve 11. The thermostatic switch 13, as before, will operate to cut-in and cut-out the compressor wherever, because of the conductivity of the metallic evaporator, the temperature thereof at the bulb 12 exceeds or diminishes below the 20° F. temperature for which the switch is set to operate.

The operation of a refrigerating system employing my method of cold control is the same when employing refrigerants which attain the desired temperature and pressure below atmospheric pressure except that the spring is placed under tension to oppose the bellows as will readily be understood.

From the foregoing description it will now be seen that I have provided a new and improved method of controlling the rate of heat transfer to an evaporator or so called cold control, in which provision is made for cold control without sacrificing efficiency during normal operation of the refrigerating system. By my method of obtaining cold control it will be appreciated that during the maintenance of normal operating temperature the compressor is operating at its maximum efficiency. Another advantage provided by my method is that it permits the adjusting means for the cold control to be readily accessible, through the food compartment door opening.

What I claim and desire to secure by Letters Patent of the United States is:

1. In a refrigerating apparatus a cabinet having a compartment and an opening leading into said compartment, a movable closure member for said opening, a refrigerant evaporator within said compartment, means operatively connected to said evaporator for supplying a refrigerant medium thereto, a control device associated with said evaporator operable in response to changes in pressure of the refrigerant within the evaporator to maintain a predetermined desired evaporator temperature, and manually operable adjusting means for said control device and extending therefrom toward said opening in said cabinet and readily accessible therethrough for adjusting said control device to operate in response to a different evaporator pressure to maintain a corresponding evaporator temperature.

2. In a refrigerating apparatus comprising a cabinet having a compartment and an opening leading into said compartment, a movable closure member for said opening, a refrigerant evaporator within said compartment, a refrigerant condensing element operatively connected to said refrigerant evaporator, an adjustable expansion valve within said compartment and controlling the admittance of refrigerant to the evaporator to control the pressure and corresponding temperature of the refrigerant in the evaporator, and manually operable adjusting means for said expansion valve and extending therefrom toward said opening and readily accessible therethrough for adjusting said expansion valve to vary the pressure and corresponding temperature in the evaporator.

3. The method of controlling the operation of a refrigerating system which comprises supplying a refrigerating medium to an evaporator at an evaporator inlet pressure corresponding to the highest evaporator temperature desired for normal operation of the system, supplying the medium to the evaporator at a lower inlet pressure to obtain a lower evaporator temperature adjacent its inlet for abnormal operation of the system, and stopping the supply of the refrigerating medium upon the occurrence of a predetermined temperature adjacent the outlet of the evaporator irrespective of the inlet pressure.

4. The method of controlling the operation of a refrigerating system which comprises the step of supplying the refrigerant medium to the evaporator at a predetermined inlet pressure corresponding substantially to the highest normal operating temperature of the evaporator for obtaining the normally desired refrigerating effect at maximum system efficiency, and then providing an abnormal effect by the step of admitting the refrigerant medium to the evaporator at a predetermined lower inlet pressure in order to provide a lower evaporator temperature adjacent the evaporator inlet.

IRVING J. KNUDSON.